Nov. 20, 1928.  1,692,535
G. M. BACON
STEERING MECHANISM FOR MOTOR VEHICLES
Filed Jan. 14, 1924
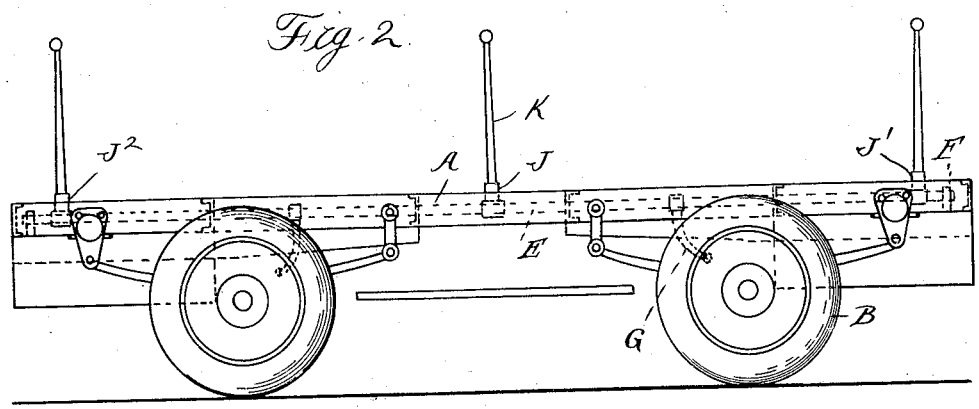
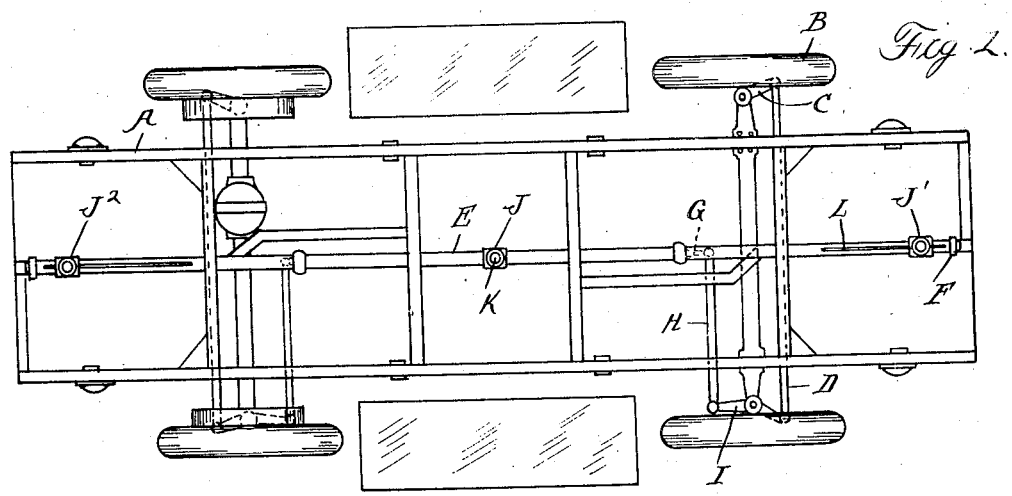
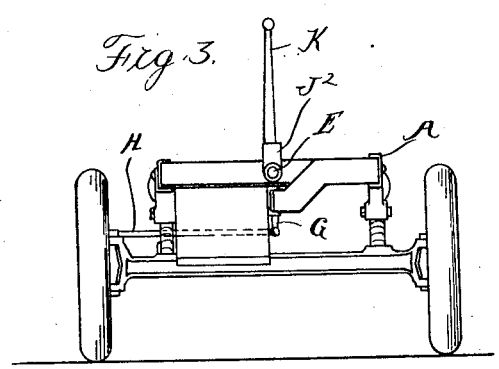
Inventor
George M. Bacon
By Whittemore Hulbert Whittemore
& Belknap
Attorneys Patented Nov. 20, 1928.

1,692,535

UNITED STATES PATENT OFFICE.

GEORGE M. BACON, OF DETROIT, MICHIGAN, ASSIGNOR TO DIVCO-DETROIT CORPORATION, OF DETROIT, MICHIGAN, A CORPORATION OF MICHIGAN.

STEERING MECHANISM FOR MOTOR VEHICLES.

Application filed January 14, 1924. Serial No. 686,163.

REISSUED

The invention relates to a steering mechanism for motor vehicles, being more particularly applicable to delivery vehicles and of that type designed for house to house deliveries, as in the delivery of milk. It is the object of the invention to provide means for controlling the steering from a plurality of points so as to avoid the necessity of the driver always returning to the same point and thereby expediting his deliveries. The invention therefore consists in the construction as hereinafter set forth.

In the drawings:

Figure 1 is a plan view of a vehicle chassis provided with my improved steering mechanism;

Figure 2 is a side elevation;

Figure 3 is an end elevation.

For house to house deliveries, such as the delivery of milk, it is usual to employ horse drawn vehicles which can generally be controlled without the driver returning to his seat. Where motor vehicles are substituted, there is the objection that these are usually controlled from a single point, which necessitates the driver entering the car each time it is shifted in position. With my improved construction the steering may be controlled from several points, as for instance from opposite ends of the car and from either side thereof. This, when associated with motor control mechanism from corresponding points, will enable the operator to easily and more expeditiously shift his car from house to house. As shown in Figures 1 and 2, A is the chassis frame, B the steering wheels, C the steering knuckles thereof, and D the connecting cross link, all of any suitable construction. E is a rock shaft which extends longitudinally of the chassis, preferably in the central plane thereof, being journaled at suitable points in bearings F. Depending from this rock shaft is the rock arm G which is connected by the link H with the rock arm I on one of the steering knuckles. J are socket bearings engaging the shaft E and located at different points in the length thereof. As shown, two of these socket bearings J' and J² are arranged adjacent to the opposite ends of the shaft and one at the longitudinal center. K are lever arms engaging the sockets J and extending upward to a suitable height for convenient control. The end socket bearings J' and J² preferably slidably engage the rock shaft E and are held from independent rocking by splines L. This permits the shifting of each of said sockets from a position at the end of the shaft to a position further in on the chassis frame.

From the above it is believed that the operation and advantages of the present invention will be readily apparent. For instance, if the operator in returning to the vehicle approaches one end, he can steer from this end. He also has similar control from the opposite end, or, in case he approaches from either side, he can reach the central steering lever from either running board. In case he is at one end of the vehicle but desires to move the same in the reverse direction, he can face in this direction looking over the top of the load, which is limited in height, and by sliding the socket member such as J' along the splines L room is provided for him to stand in rear of the lever K.

It is to be understood that the motor control, which forms no part of the present invention, may be also operable from each of the several points.

What I claim as my invention is:

1. The combination with a vehicle chassis and steering mechanism therefor, of a rock shaft extending longitudinally of said chassis and operatively connected to said steering mechanism, a plurality of socket bearings on said rock shaft at different points in the length thereof, certain of said sockets being keyed to said shaft but longitudinally adjustable thereon and an upwardly extending controlling lever for engaging said sockets.

2. The combination with a vehicle chassis and steering mechanism therefor, of a rock shaft operatively connected to said steering mechanism, and lever arms at a plurality of points directly engaging said rock shaft for rocking said shaft, certain of said lever arms being keyed to said shaft but longitudinally adjustable thereon.

3. The combination with a vehicle chassis and steering mechanism therefor, of a rock shaft extending longitudinally of said chassis and operatively connected to said steering mechanism, a plurality of socket bearings mounted at intervals along said rock shaft, one of the said socket bearings being rigidly mounted on the said shaft and others of the said socket bearings being slidably mounted thereon and arms adapted for detachable engagement with said socket bearings, said arms being adapted to be oscillated through an arc thereby imparting rotational motion to said rock shaft.

4. The combination with a vehicle chassis and steering mechanism therefor, of a rock shaft extending longitudinally of said chassis and operatively connected to said steering mechanism, a plurality of socket bearings mounted at intervals along said rock shaft and slidable longitudinally thereof, said socket bearings being fixed for rotation with said rock shaft, arms removably received by said socket bearings, adapted to impart rotational movement to said rock shaft by oscillation in a plane transversely of said rock shaft.

5. The combination with a vehicle chassis and steering mechanism therefor, of a rock shaft extending longitudinally of said chassis and operatively connected to said steering mechanism, a plurality of steering controls comprising rock arms removably mounted in bearing sockets carried by said rock shaft, said steering controls and mountings therefor being movable longitudinally of said rock shaft and positionable at varying distances from the ends thereof.

6. The combination with a vehicle chassis and steering mechanism therefor, of a rock shaft for actuating the steering mechanism, a plurality of sockets splined to said rock shaft for longitudinal adjustment thereon, and controlling arms detachably engageable in the said sockets.

7. The combination with a vehicle chassis and steering mechanism therefor, of a rock shaft for actuating the steering mechanism, and control arms extending upwardly from said shaft at the opposite ends and at an intermediate point in the length thereof, the control arms at the ends of said shaft being splined to the shaft for longitudinal adjustment thereon.

In testimony whereof I affix my signature.

GEORGE M. BACON.